(12) United States Patent
Poloniewicz

(10) Patent No.: US 12,079,683 B2
(45) Date of Patent: *Sep. 3, 2024

(54) METHODS AND SYSTEMS OF HARVESTING DATA FOR TRAINING MACHINE LEARNING (ML) MODEL

(71) Applicant: Hand Held Products, Inc., Charlotte, NC (US)

(72) Inventor: Paul R. Poloniewicz, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,904

(22) Filed: Jun. 29, 2023

(65) Prior Publication Data

US 2023/0342575 A1 Oct. 26, 2023

Related U.S. Application Data

(63) Continuation of application No. 17/075,389, filed on Oct. 20, 2020, now Pat. No. 11,734,531.

(51) Int. Cl.
*G06K 7/14* (2006.01)
*G06F 18/214* (2023.01)
(Continued)

(52) U.S. Cl.
CPC ......... *G06K 7/1413* (2013.01); *G06F 18/214* (2023.01); *G06K 7/10881* (2013.01);
(Continued)

(58) Field of Classification Search
None
See application file for complete search history.

(56) References Cited

U.S. PATENT DOCUMENTS 8,366,004 B2   2/2013   Li et al.
8,867,857 B2   10/2014  Santos et al.
(Continued)

FOREIGN PATENT DOCUMENTS

WO   2000/016242 A1   3/2000

OTHER PUBLICATIONS

CN Office Action Mailed on Feb. 28, 2024 for CN Application No. 202111148053, 7 page(s).
(Continued)

*Primary Examiner* — Kristy A Haupt
(74) *Attorney, Agent, or Firm* — Alston & Bird LLP

(57) ABSTRACT

Various embodiments disclosed herein describe a method comprising receiving indicia data from an indicia scanner. The indicia data comprises at least decoded data obtained based on decoding an indicium in an image, an image tile comprising a portion of the indicium, and/or location of one or more corners of the portion of the indicium in the image. Further, the method includes generating an image of an ideal indicium based on at least the decoded data. Thereafter, the image of the ideal indicium is modified to generate a modified image of the ideal indicium. Further, the portion of the indicium is retrieved from modified image. A clean image tile comprises a portion of the ideal indicium. Furthermore, the method includes generating training data, wherein the training data includes the portion of the indicium and the portion of the ideal indicium.

20 Claims, 11 Drawing Sheets

(51) Int. Cl.
  *G06K 7/10* (2006.01)
  *G06N 20/00* (2019.01)
  *G06T 3/60* (2024.01)
  *G06T 7/00* (2017.01)
  *G06T 7/11* (2017.01)
  *G06T 7/70* (2017.01)

(52) U.S. Cl.
  CPC ............... *G06N 20/00* (2019.01); *G06T 3/60* (2013.01); *G06T 7/0002* (2013.01); *G06T 7/11* (2017.01); *G06T 7/70* (2017.01); *G06K 2007/10524* (2013.01); *G06T 2207/20081* (2013.01); *G06T 2207/30168* (2013.01)

(56) References Cited

U.S. PATENT DOCUMENTS

| | | | |
|---|---|---|---|
| 11,734,531 B2* | 8/2023 | Poloniewicz | G06T 7/0002 235/462.45 |
| 2005/0224581 A1 | 10/2005 | Reichenbach et al. | |
| 2010/0187311 A1 | 7/2010 | Van et al. | |
| 2013/0153662 A1 | 6/2013 | Narasa Prakash | |
| 2019/0303636 A1 | 10/2019 | Olivastri | |
| 2020/0193112 A1 | 6/2020 | Pang et al. | |
| 2021/0097517 A1 | 4/2021 | Handshaw et al. | |
| 2022/0075973 A1 | 3/2022 | Genuise | |

OTHER PUBLICATIONS

Brylka, Robert, et al: "Camera Based Barcode Localization and Decoding in Real-World Applications", 2020 International Conference On Omni-Layer Intelligent Systems (Coins), IEEE, Aug. 31, 2020, pp. 1-8, DOI: 10.1109/COINS49042.2020.9191416 [retreived on Sep. 9, 2020].

Doerr, Laura, et al: "Lean Training Data Generation for Planar Object Detection Models in Unsteady Logistics Contexts", 2019 18th IEEE International Conference On Machine Learning and Applications (ICMLA), IEEE, Dec. 16, 2019, pp. 329-334, DOI: 10.1109/ICMLA.2019.00062 [retrieved on Feb. 13, 2020].

European search report Mailed on Mar. 25, 2022 for EP Application No. 21200012, 9 page(s).

Ex Parte Quayle Action Mailed on Dec. 9, 2022 for U.S. Appl. No. 17/075,389.

Extended European search report Mailed on Mar. 25, 2022 for EP Application No. 21200012, 9 pages.

Notice of Allowance and Fees Due (PTOL-85) Mailed on Apr. 5, 2023 for U.S. Appl. No. 17/075,389, 8 page(s).

* cited by examiner

METHODS AND SYSTEMS OF HARVESTING DATA FOR TRAINING MACHINE LEARNING (ML) MODEL

CROSS REFERENCE TO RELATED APPLICATIONS

This application is a continuation of U.S. application Ser. No. 17/075,389, filed Oct. 20, 2020, titled "Methods And Systems Of Harvesting Data For Training Machine Learning (ML) Model," the contents of which are incorporated by reference herein in their entirety.

TECHNICAL FIELD

Example embodiments of the present disclosure relate generally to a machine learning (ML) model and, more particularly, to systems and methods for harvesting data for training the ML model.

BACKGROUND

Generally, a machine learning (ML) model may correspond to a mathematical model and/or a probabilistic model that may be capable of predicting an outcome. Further, the ML model may be optimized based on a domain in which the ML model is to be used. For example, in the domain of indicia scanning, the ML model may be utilized for identifying an indicium in a field of view of the indicia scanner. Further, in some scenarios, the ML model may be used for decoding the indicium. Prior to deploying the ML model, the ML model may be trained on training data.

BRIEF SUMMARY

Various embodiments disclosed herein describe a method comprising receiving indicia data from an indicia scanner. The indicia data comprises at least decoded data obtained based on decoding an indicium in an image, an image tile comprising a portion of the indicium, and/or location of one or more corners of the portion of the indicium in the image. Further, the method includes generating an image of an ideal indicium based on at least the decoded data. Thereafter, the image of the ideal indicium is modified to generate a modified image of the ideal indicium. Further, the portion of the indicium is retrieved from modified image. A clean image tile comprises a portion of the ideal indicium. Furthermore, the method includes generating training data, wherein the training data includes the portion of the indicium and the portion of the ideal indicium.

Various embodiments illustrated herein describe a central server that includes a memory device comprising a set of instructions. A processor configured to execute the set of instructions, wherein the processor is configured to receive indicia data from an indicia scanner, wherein the indicia data comprises at least decoded data obtained based on decoding an indicium in an image, an image tile comprising a portion of the indicium, and/or location of one or more corners of the portion of the indicium in the image. The processor is further configured to generate an image of an ideal indicium based on at least the decoded data. Further, the processor is configured to modify the image of the ideal indicium to generate a modified image of the ideal indicium, wherein an orientation of the ideal indicium in the modified image is same as an orientation of the indicium in the image. Additionally, the processor is configured to retrieve a clean image tile, from the modified image of the ideal indicium, based on the location, in the image, of one or more corners of the portion of the indicium, wherein the clean image tile comprises a portion of the ideal indicium. Furthermore, the processor is configured to generate training data, wherein the training data includes the portion of the indicium and the portion of the ideal indicium.

Various embodiments illustrated herein describe an indicia scanner comprising an image capturing unit configured to capture an image of a field of view of the indicia scanner, wherein the image includes an indicium. Further, the indicia scanner comprises a processor communicatively coupled to the image capturing unit. The processor is configured to segment the image into a plurality of image tiles. Further, the processor is configured to determine a quality score for each of one or more image tiles of the plurality of image tiles, wherein the one or more image tiles comprises a portion of the indicium. Additionally, the processor is configured to select an image tile of the one or more image tiles based on the quality score associated with each of the one or more image tiles. Furthermore, the processor is configured to transmit the image tile to a central server, wherein the image tile constitutes training data for training a machine learning model.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
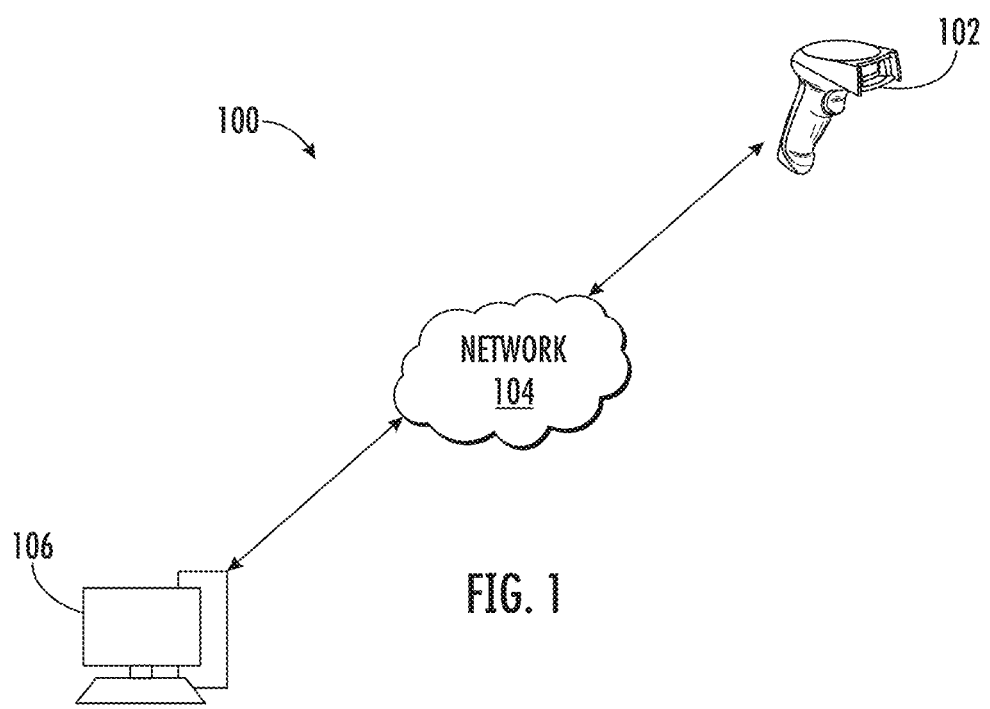
FIG. 1 illustrates a system environment where various embodiments of the present disclosure are implemented.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "indicium" has been broadly intended to include any indicia, or a machine readable code including Linear symbols, 2D barcodes (such as QR code, and Datamatrix codes), RFID tags, IR tags, near-field-communication (NFC) tags, and characters that are readable by a computing device (for example, an indicia scanner). Indicia are typically graphical representations of information (e.g., data), such as product numbers, package tracking numbers, patient barcode symbology identifier numbers, medication tracking identifiers, personnel barcode symbology identifier numbers, etc.

The term "quality" may refer to standard or protocol based on which content may be evaluated or compared with each other. For example, quality of an image may be evaluated based on sharpness of the image, noise in the image, dynamic range of the image, and/or the like. In some examples, the quality of the image may be further evaluated based on the quality of certain portions of the image. For example, the quality of the image may be evaluated based on quality of indicium in the image. To this end, the quality of the indicium may be evaluated based on ANSI X3.182, ISO15415, and ISO/IEC 15416 standards.

The term "location" may refer to a point or a single coordinate in an image. In some examples, the location in an image may be represented in one or more coordinate systems such as, but not limited Cartesian coordinate system, Polar coordinate system, and/or the like.

A machine learning (ML) model, optimized for the indicia scanning operation, may be utilized by a processor in an indicia scanner to perform various operations. For example, the ML model may be utilized by the processor of the indicia scanner to identify an indicium in the field of view of the indicia scanner.

Embodiments of the present invention recognize that generally, an ML model is trained on training data prior to deployment of the ML model in the indicia scanner. One of the primary roadblocks in creating robust solutions based on machine learning is a lack of a sufficient quantity of high-quality training data. Creating robust solutions for applications requires hundreds of thousands of samples or more to adequately prepare an ML model for unfettered operation in the real world.

In supervised training, the difficulty in obtaining sufficient training data is exacerbated by the need to obtain training pairs, not just single unrelated samples. For example, to train an image reconstruction ML model requires a training pair consisting of a "Damaged" image and a corresponding "Clean" image. The ML model is trained to transform a given Damaged image into the desired Clean image. A Clean image is usually not readily available, posing a great challenge to creating robust supervised learning solutions.

Also, it is important to note that in order for the training data to adequately represent the actual images seen in the working environment, the training data must actually come from the working environment. ML Models trained with laboratory and simulated data may have limited accuracy and tend to deliver subpar results.

In pursuit of creating robust ML applications in the barcode decoding application space, it is clear new techniques are required to surmount the obstacles in obtaining a sufficiently large, representative, and diverse set of training image pairs from various devices operating in their native work environments.

In some examples, the training data may correspond to data that may include one or more features and/or one or more labels that are specific to a domain for training the ML model. In some examples, the one or more features may correspond to parameters that may constitute an input to the ML model. Further, the one or more labels in the training data may correspond to an expected output of the ML model. For example, in the indicia scanning domain, the one or more features (i.e., the input to the ML model) in the training data may correspond to an image of the indicium captured by the indicia scanner. Further, the one or more labels in the training data may include a clean image of the indicium (i.e., the expected output of the ML model). However, capturing clean images using the indicia scanner may be a challenge due to various operational factors associated with the indicia scanner such as, but not limited to, ambient lighting conditions in which the indicia scanner operates, orientation of the indicia scanner with respect to the indicium (to be captured) and/or the like.

Additionally, due to limited memory space and limited processing capabilities of the processor in the indicia scanner, the indicia scanner may be incapable of storing and/or processing a large amount of images. To this end, the indicia scanner may be incapable of generating training data and accordingly may be unable to train the ML model using the training data. Therefore, in some examples, the indicia scanner may be configured to transmit the images to a central server, where central server may generate the training data and may train the ML model using the training data. In one example, an indicia scanner captures an image of size ~2.3 MB. Accordingly, if a worker (using the indicia scanner) scans ~1500 indicia during working hours, the indicia scanner may generate approximately 3.5 GB of data. Daily transmitting such amount of data to the central server may be inefficient and would require large amount of network bandwidth.

According to the embodiments disclosed herein, an indicia scanner may scan and decode an indicium in an image to generate decoded data. During the scanning and decoding of the indicium, the indicia scanner may be configured to determine one or more indicium locations in the image. In some examples, the one or more indicium locations may encompass the indicium in the image. Additionally or alternatively, the indicia scanner may be configured to determine a barcode symbology identifier of the indicium. The barcode symbology identifier of an indicium may be indicative of a type of the indicium scanned by the indicia reader. Some examples of the type of an indicium may include, but are not limited to, a Code 39, Code 128, Code 11, PDF417, Datamatrix, QR Code, Aztec Code. Additionally or alternatively, the indicia scanner may be configured to retrieve, referred to as an image tile, from an image that includes a portion of the indicium. Further, the indicia scanner may be configured to determine one or more image tile locations that encompass the portion of the indicium in the image (i.e., the image tile). In an example embodiment, the indicia scanner may be configured to generate indicia data. In some examples, the indicia data may include, the decoded data, the one or more indicium locations in the image, the one or more image tile locations in the image, the barcode symbology identifier of the indicium, the image tile, and a size of the image (e.g., a resolution of the image). Thereafter, the indicia scanner may be configured to transmit the indicia data to the central server. The bandwidth required to transmit the indicia data of the image tile (that includes the portion of the indicium) is greatly reduced in comparison to transmitting the complete image.

In some examples, the central server may generate an ideal indicium using the decoded data and the barcode symbology identifier associated with the indicium (received by the server as indicia data). In an example embodiment, the ideal indicium generated by the central server is an ideal form of the indicium scanned by the indicia reader. Those having ordinary skills in the art would appreciate that the ideal indicium corresponds to an image of the scanned indicium. Thereafter, the central server may modify the image of the ideal indicium such that the ideal indicium (in the modified image) has same orientation and size as that of the indicium in the scanned image. In some examples, the central server may modify the image of the ideal indicium using a homographic matrix. In an example embodiment, the homographic matrix may correspond to a transformation matrix that is representative of the relation between the one or more indicium locations in the scanned image and one or more ideal indicium locations.

In some examples, the central server may be further configured to retrieve a clean image tile from the modified image of the ideal indicium using the one or more image tile locations (received in the indicia data). In an example embodiment, the clean image tile includes a portion of the ideal indicium. In an example embodiment, since the ideal indicium has same orientation and size in the modified image as that of the indicium in the scanned image, accordingly, the clean image tile may include same content as included in the scanned image tile. For example, both the scanned image tile and the clean image tile include the portion of the indicium. More particularly, the portion of the ideal indicium (included in the clean image tile) is same as the portion of the scanned indicium (included in the image tile). In some examples, the portion of the ideal indicium (generated by the central server) may be noise free and may be referred as clean portion of the indicium. On the other hand, the portion of the indicium (retrieved from indicia data) is considered as the damaged portion of the indicium. Thereafter, the central server may be configured to utilize the clean portion of the indicium and the damaged portion of the indicium, as training data to train a machine learning (ML) model.

FIG. 1 illustrates a system environment 100 where various embodiments of the present disclosure are implemented. In an example embodiment, the system environment 100 includes an indicia scanner 102, a network 104, and a central server 106.

In an example embodiment, the indicia scanner 102 may correspond to a mobile device, such as a hand-held indicia scanner, a portable data terminal, mobile phone, a tablet, portable computer, etc, or may be a stationary terminal being fixed to a single position, such as along an assembly line, which is capable of capturing the one or more images. In an example embodiment, the indicia scanner 102 may be capable of identifying and decoding an indicium in the captured images, as is further described in conjunction with FIG. 3. Further, the indicia scanner 102 may be configured to generate indicia data based on the decoding of the indicium, as is further described in FIG. 3. The structure of the indicia scanner 102 is further described in conjunction with FIG. 2.

The network 104 corresponds to a medium through which content and messages flow between various devices in the system environment 100 (e.g., the central server 106 and the indicia scanner 102). Examples of the network 104 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 104 in accordance with various wired and wireless communication protocols such as, but not limited to, Transmission Control Protocol and Internet Protocol (TCP/IP), User Datagram Protocol (UDP), and 2G, 3G, 4G, or 5G communication protocols.

In an example embodiment, the central server 106 may refer to a computing device that may be configured to communicate with the indicia scanner 102. The central server 106 may comprise one or more processors and one or more memories. The one or more memories may include computer readable code that may be executable by the one or more processors to perform predetermined operations. Further, the central server 106 may include one or more interfaces that may facilitate communication with the indicia scanner 102 through the network 104. In an example embodiment, the central server 106 may be configured to receive indicia data from the indicia scanner 102, as is further described in FIG. 8. Further the central server 106 may be configured to generate training data from the indicia data, as is further described in FIG. 8. Examples of the central server 106 may include, but are not limited to, a personal computer, a laptop, a personal digital assistant (PDA), a mobile device, a tablet, or other such computing device. the structure of the central server 106 is further described in conjunction with FIG. 10.

Figure 2:
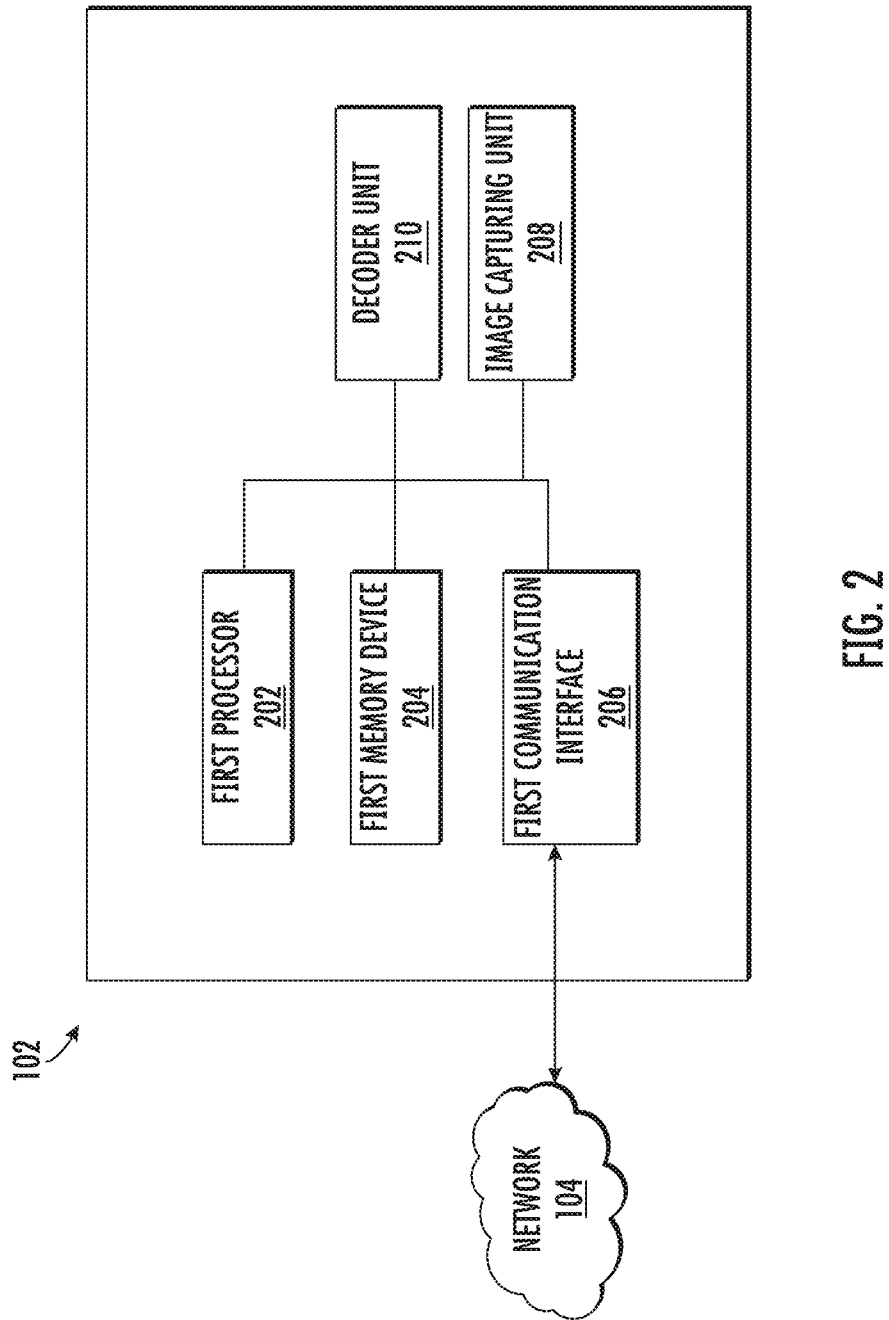
FIG. 2 illustrates a block diagram of an indicia scanner, according to one or more embodiments described herein.

FIG. 2 illustrates a block diagram of an indicia scanner 102, according to one or more embodiments described herein. In some examples, the indicia scanner 102 includes a first processor 202, a first memory device 204, a first communication interface 206, an image capturing unit 208, and a decoder unit 210.

The first processor 202 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 2 as a single processor, in an embodiment, the first processor 202 may include a plurality of processors and signal processing modules. The plurality of processors may be embodied on a single electronic device or may be distributed across a plurality of electronic devices collectively configured to function as the circuitry of the indicia scanner 102. The plurality of processors may be in operative communication with each other and may be collectively configured to perform one or more functionalities of the circuitry of the indicia scanner 102, as described herein. In an example embodiment, the first processor 202 may be configured to execute instructions stored in the first memory device 204 or otherwise accessible to the first processor 202. These instructions, when executed by the first processor 202, may cause the circuitry of the indicia scanner 102 to perform one or more of the functionalities, as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA or the like, the first processor 202 may include specifically configured hardware for conducting one or more operations described herein. Alternatively, as another example, when the first processor 202 is embodied as an executor of instructions, such as may be stored in the first memory device 204, the instructions may specifically configure the first processor 202 to perform one or more algorithms and operations described herein.

Thus, the first processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 204 may include suitable logic, circuitry, and/or interfaces that are adapted to store a set of instructions that is executable by the first processor 202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the first memory device 204 may be integrated with the first processor 202 on a single chip, without departing from the scope of the disclosure.

The first communication interface 206 may correspond to a communication interface that may facilitate transmission and reception of messages and data to and from various devices operating in the system environment 100 through the network 104. For example, the first communication interface 206 is communicatively coupled with the central server 106 through the network 104. In some examples, through the first communication interface 206, the indicia scanner 102 may be configured to transmit the indicia data to the central server 106. Examples of the first communication interface 206 may include, but are not limited to, an antenna, an Ethernet port, a USB port, a serial port, or any other port that can be adapted to receive and transmit data. The first communication interface 206 transmits and receives data and/or messages in accordance with the various communication protocols, such as but not limited to, I2C, TCP/IP, UDP, and 2G, 3G, 4G, or 5G communication protocols.

In an example embodiment, the image capturing unit 208 may include suitable logic and/or circuitry that may enable the image capturing unit 208 to capture an image of the field of view of the indicia scanner 102. In some examples, the image may include the image of the indicium. In an example embodiment, the image capturing unit 208 may include an image sensor. In some examples, the image sensor is referred to as a solid state device that is capable of generating electrical signals corresponding to the light signals that impinges on the image sensor. Some examples of the image sensor may include a color or monochrome 1D or 2D charged coupled device (CCD), complementary MOSFET (CMOS), Contact image sensor (CIS) or any other device, that may be capable to generate electrical signal based on the received light signals. In addition to the image sensor, the image capturing unit 208 may include one or more optical assemblies such as one or more lenses, one or more gratings, and/or one or more mirrors that may facilitate directing the light from the field of view on to the image sensor. Additionally or alternatively, the image capturing unit 208 may further include one or more driving units that may be capable of causing the one or more optical assemblies along a predetermined path. Such traversal of the one or more optical assemblies may enable focusing of the light onto the image sensor.

Figure 3:
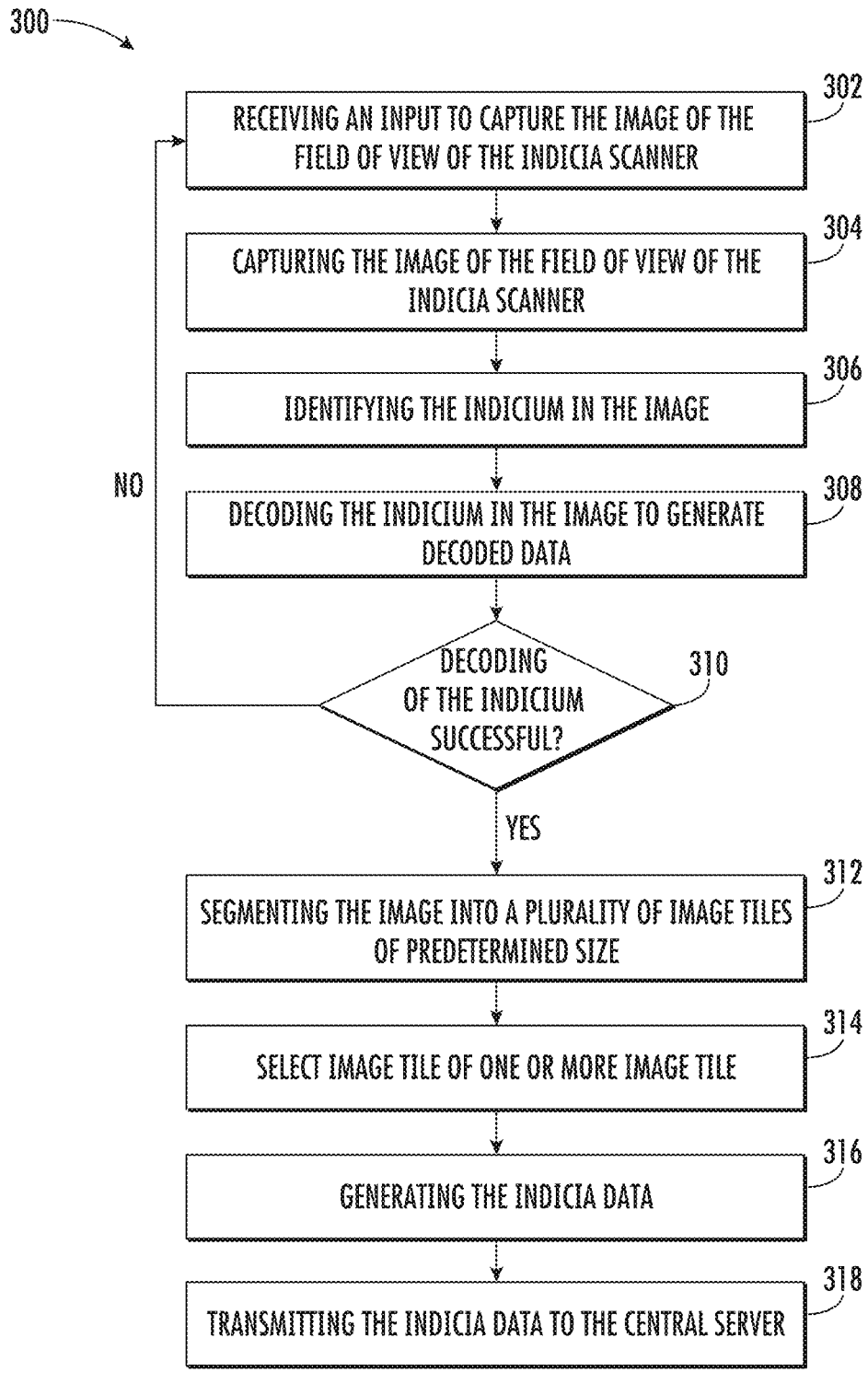
FIG. 3 illustrates a flowchart of a method for operating the indicia scanner, according to one or more embodiments described herein.
Figure 7:
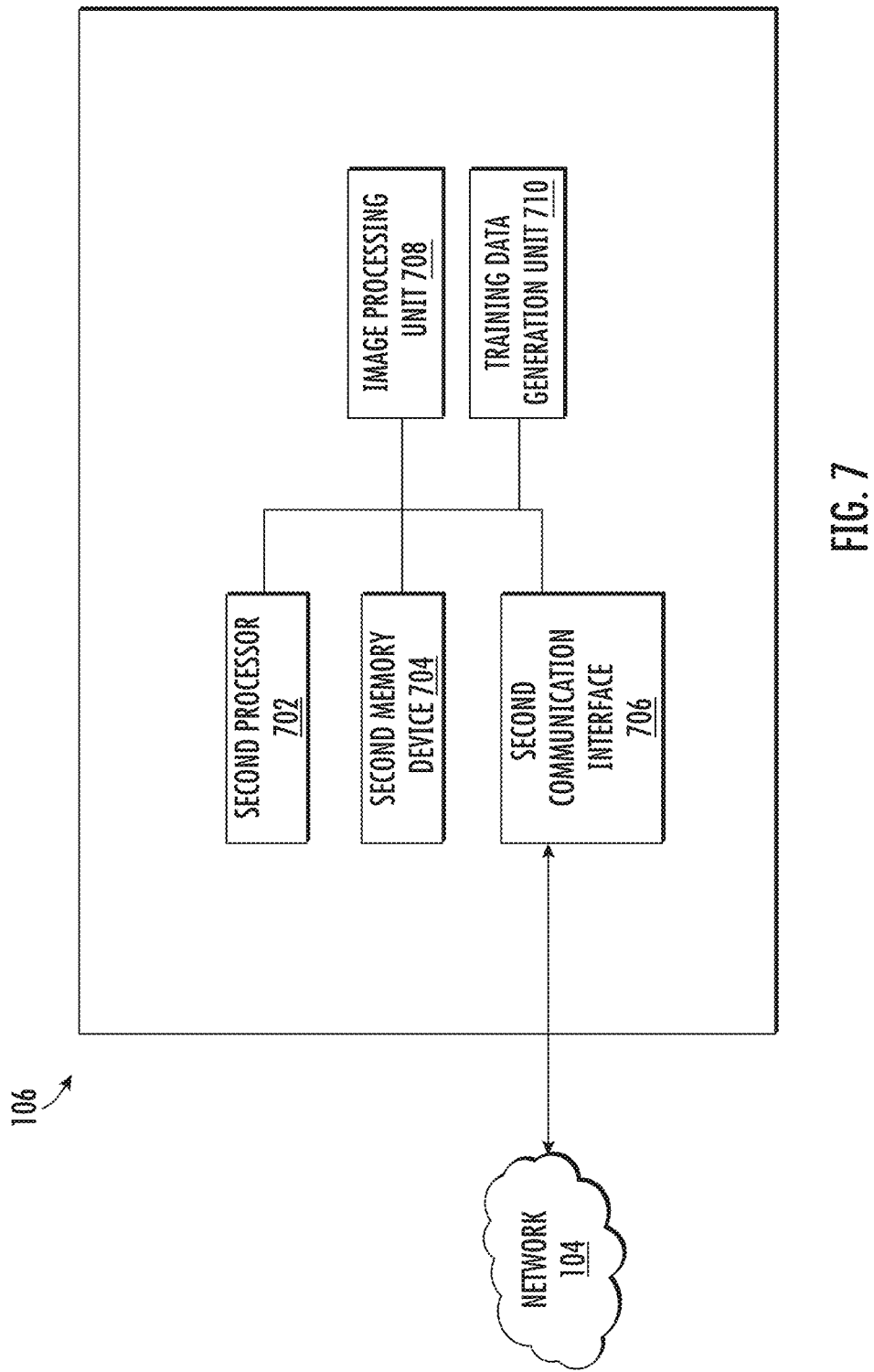
FIG. 7 illustrates a block diagram of the central server, according to one or more embodiments described herein.

The decoder unit 210 may include suitable logic and/or circuitry that may enable the decoder unit 210 to identify the indicium in the image, as is further described in FIG. 3. Further, the decoder unit 210 may be configured to determine a barcode symbology identifier associated with the indicium, as is further described in conjunction with FIG. 3. In an example embodiment, the barcode symbology identifier of the indicium may be indicative of the type of the indicium. Some examples of the type of the indicium may include, but are not limited to, Code 39, Code 128, Code 11, PDF417, Datamatrix, QR Code, Aztec Code. Additionally, in some examples, the decoder unit 210 may be configured to determine one or more indicium locations in the image, as is further described in FIG. 3. Determining the one or more indicium locations may include determining the one or more coordinates of the one or more indicium locations in the image, as is further described in FIG. 3. In some examples, the one or more indicium locations may correspond to the corners of the indicium. In an example embodiment, the one or more indicium locations may encompass the indicium in the image, as is illustrated in FIG. 7.

Additionally or alternatively, the decoder unit 210 may be configured to retrieve an image tile, from the image, such that the image tile includes a portion of the indicium, as is further described in FIG. 3. Further, the decoder unit 210 may be configured to determine the one or more image tile locations, as is further described in FIG. 3. In an example embodiment, the decoder unit 210 may be configured to decode the indicium in the image to generate decoded data, as is further described in FIG. 3. In some examples, the decoder unit 210 may be configured to generate indicia data. In some examples, the indicia data includes the decoded data (obtained from the indicium in the image), the one or more indicium locations (encompassing the indicium in the image), the one or more image tile locations (encompassing the portion of the indicium), the barcode symbology identifier of the indicium, the portion of the indicium (i.e., the image tile), and the size of the image (e.g., a resolution of the image).

In an example embodiment, the decoder unit 210 may be configured to utilize one or more known image processing techniques to manipulate and/or modify the image. Some examples of the one or more image processing techniques may include, but not limited to, edge detection, and object barcode symbology identifier techniques such as Scale invariant feature transform (SIFT). The decoder unit 210 may be implemented using one or more of Application Specific Integrated Circuit (ASIC) and Field Programmable Gate Array (FPGA).

The operation of the indicia scanner 102 is further described in conjunction with FIG. 3.

Figure 5:
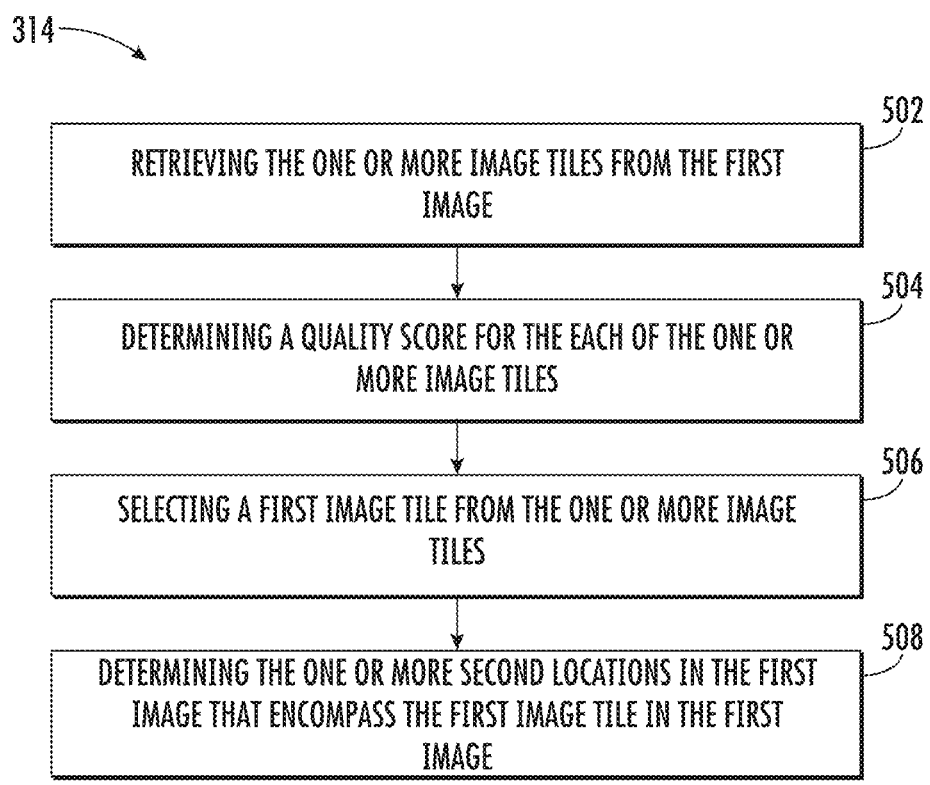
FIG. 5 illustrates a flowchart of a method for retrieving the image tile from the image, according to one or more embodiments described herein.

FIGS. 3 and 5, illustrate example flowcharts and example methods of the operations performed by an apparatus, such as the indicia scanner 102 of FIG. 1 in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 6, when executed, convert a computer or processing circuitry into a particular machine configured to perform an example embodiment of the present invention. Accordingly, the operations of FIGS. 3 and 6, define an algorithm for configuring a computer or processor, to perform an example embodiment. In some cases, a general purpose computer may be provided with an instance of the processor which performs the algorithm of FIGS. 3 and 5, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Harvesting Indicia Data at the Indicia Scanner

FIG. 3 illustrates a flowchart 300 of a method for harvesting indicia data at the indicia scanner 102, according to one or more embodiments described herein.

At step 302, the indicia scanner 102 may include means such as the first processor 202 and/or the like for receiving an input to capture an image of the field of view of the indicia scanner 102. In an example embodiment, the operator of the indicia scanner 102 may provide the input to the indicia scanner through a trigger button on the indicia scanner 102. For example, the operator may push the trigger button. In an example embodiment, in response to pushing the trigger button, the trigger button of the indicia scanner 102 may generate a trigger signal that is indicative of the received input from the operator. In some examples, the scope of the disclosure is not limited to the operator pressing the trigger button to provide the input of the indicia scanner 102. In an example embodiment, the indicia scanner 102 may trigger automatically as soon as the indicia scanner 102 detects an object present in the respective field of view. In another example, the indicia scanner 102 may receive the input from a remote computer such as a user computing device being operated by the operator.

At step 304, the indicia scanner 102 may include means such as the first processor 202, the image capturing unit 208 and/or the like for capturing the image of the field of view of the indicia scanner 102. In some examples, the first processor 202 may cause the image capturing unit 208 to capture the image in response to the reception of the trigger signal from the trigger button. As discussed, the image capturing unit 208 may include the image sensor and the one or more optical assemblies that may direct the light from the field of view of the indicia scanner 102 onto the image sensor. Accordingly, the image sensor may generate electrical signals that are representative of the image. Additionally or alternatively, the first processor 202 may be configured to render the image based on the electrical signal received from the image sensor.

At step 306, the indicia scanner 102 may include means such as the first processor 202, the decoder unit 210, and/or the like for identifying the indicium in the image. In an example embodiment, the decoder unit 210 may be configured to utilize known techniques to identify the indicium in the image. Some examples of the known techniques may include, but not limited to, neural network, ML model, Scale invariant feature transform (SIFT), and/or the like. In some examples, the scope of the disclosure is not limited to identifying the indicium in the image. In an example embodiment, the decoder unit 210 may be configured to identify other content in the image. For example, the other content in the image may include an address field, a text content, a graphic content such as a trademark, and/or the like. For the purpose of ongoing description, the decoder unit 210 may be configured to identify the indicium in the image.

In some examples, during the barcode symbology identification of the indicium in the image, the decoder unit 210 may be configured to determine the one or more indicium locations. The one or more indicium locations, in the image, correspond to the location of the indicium in the image. In an example embodiment, the one or more indicium locations (in the image) may define the periphery of the indicium. Accordingly, the one or more indicium locations may encompass the indicium in the image. In an example embodiment, identifying the one or more indicium locations may include determining the coordinates of the indicium in the image.

At step 308, the indicia scanner 102 may include means such as the first processor 202, the decoder unit 210, and/or the like for decoding the indicium in the image to generate decoded data. In an example embodiment, the decoder unit 210 may be configured to decode the indicium using one or more known decoding algorithms. Prior to decoding the indicium, the decoder unit 210 may be configured to determine the barcode symbology identifier associated with the indicium. As discussed, the barcode symbology identifier may depict the type of the indicium. For example, the decoder unit 210 may be configured to identify known marking on the indicium to determine the type of the indicium in the image. In an example embodiment, the decoder unit 210 may be configured to utilize one or more known image processing techniques such edge detection, object identification, image binarization, and/or the like to identify known markings on the indicium.

For example, if the decoder unit 210 identifies one or more square patterns on the corners of the indicium, the decoder unit 210 may identify the type of the indicium as QR code. In another example, if the decoder unit 210 identifies a contiguous line on two orthogonal edges of the indicium, the decoder unit 210 may identify the type of the indicium as datamatrix code. In yet another example, if the decoder unit 210 identifies multiple parallel lines in the indicium, the decoder unit 210 may be configured to identify the type of the indicium as Code 39. Thereafter, based on the known markings the decoder unit 210 may be configured to determine the barcode symbology identifier. Thereafter, the first decoder unit may be configured to utilize the one or more known decoding algorithms to decode the indicium based on the barcode symbology identifier.

At step 310, indicia scanner 102 may include means such as the first processor 202, the decoder unit 210, the decoder unit 210, and/or the like for determining whether the decoding of the indicium is successful. If the decoder unit 210 determines that the decoding of the indicium is unsuccessful, the decoder unit 210 may be configured to repeat the step 302. However, if the decoder unit 210 determines that the decoding of the indicium is successful, the decoder unit 210 may be configured to perform the step 312.

Figure 4:
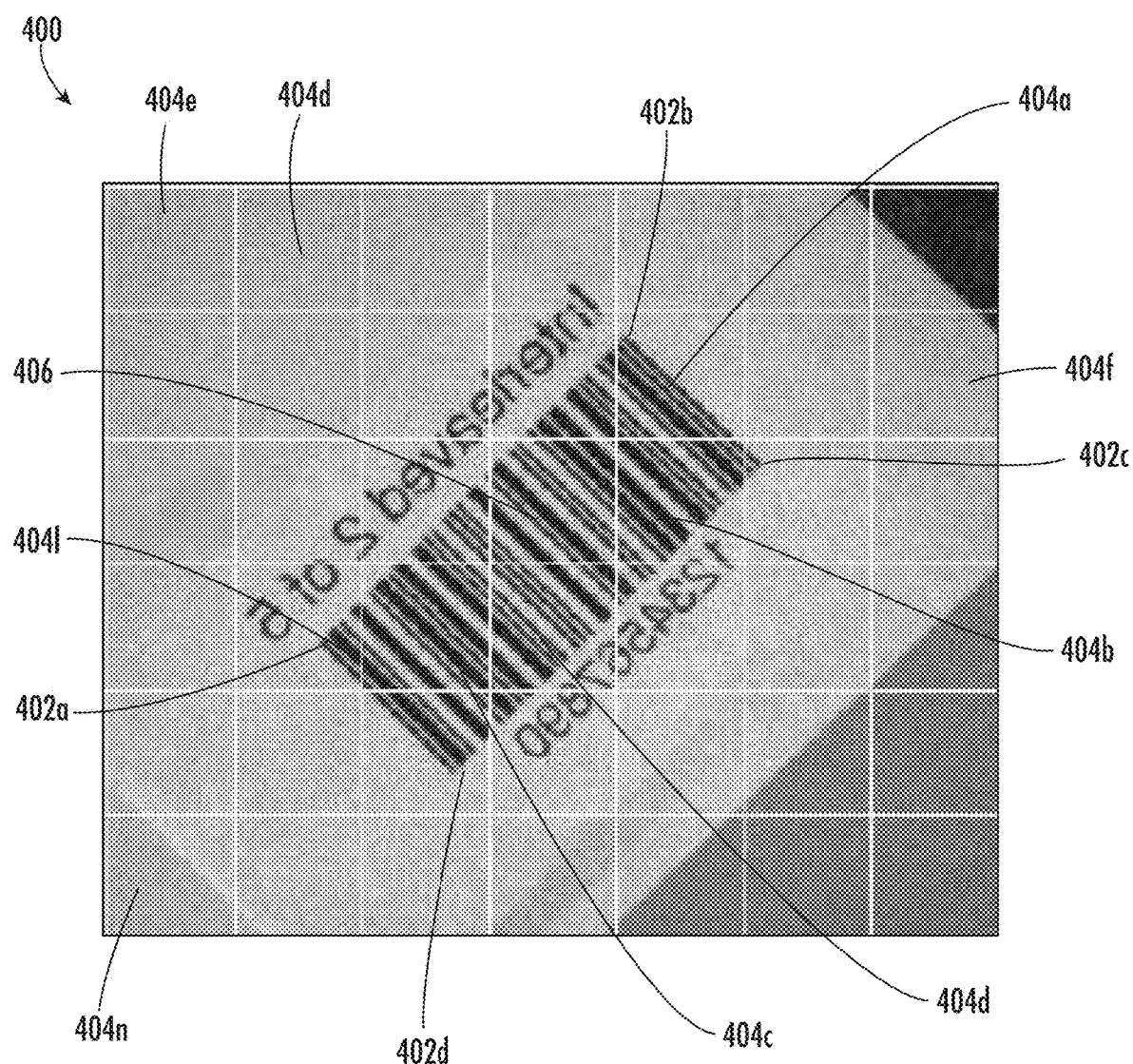
FIG. 4 illustrates an example image, according to one or more embodiments described herein.

At step 312, the indicia scanner 102 may include means such as the first processor 202, the decoder unit 210, and/or the like for segmenting the image into a plurality of image tiles of predetermined size. In an example embodiment, the predetermined size may define a count of pixels included in each image tile of the plurality of image tiles. Thereafter, the first processor 202 may be configured to select one or more image tiles of the plurality of images tiles that include the indicium. In an example embodiment, the first processor 202 may be configured to identify one or more image tiles of the plurality of image tiles based on the one or more indicium locations in the image. For example, the first processor 202 may be configured to select the one or more image tiles that include the indicium. Additionally or alternatively, the first processor 202 may be configured to select the one or more image tiles (of the plurality of image tiles) that are encompassed within the one or more indicium locations. Since the indicium is encompassed within the one or more indicium locations, accordingly, the one or more image tiles may include the indicium. FIG. 4 illustrates an example segmentation of the image.

At step 314, the indicia scanner 102 may include means such as the first processor 202, the decoder unit 210, and/or the like for selecting the image tile from the one or more image tiles. In an example embodiment, the image tile includes a portion of the indicium. The selection of the image tile, is further described in conjunction with FIG. 6. In some examples, selecting of the image tile (of the one or more image tiles) includes determining one or more image tile locations in the image that corresponds to the location of the image tile in the image. In an example embodiment, the one or more image tile locations (in the image) may define the periphery of the image tile in the image. Accordingly, the one or more image tile locations may encompass the image tile in the image. In an example embodiment, identifying the one or more image tile locations may include determining the coordinates of the one or more image tile locations in the image. The determining of the one or more image tile locations in the image is further described in conjunction with FIG. 6.

At step 316, the indicia scanner 102 may include means such as the first processor 202, and/or the like for generating the indicia data. In an example embodiment, the indicia data includes the decoded data (obtained from the indicium in the image), the one or more indicium locations (encompassing the indicium in the image), the one or more image tile locations (encompassing the portion of the indicium), the barcode symbology identifier of the indicium, the portion of the indicium (i.e., the image tile), and the size of the image (e.g., a resolution of the image). An example indicia data is illustrated in FIG. 7.

At step 318, indicia scanner 102 may include means such as the first processor 202, the first communication interface, and/or the like for transmitting the indicia data to the central server 106.

FIG. 4 illustrates an example image 400, according to one or more embodiments described herein.

The decoder unit 210 identifies the indicium 406 in the image 400, as is described in the step 306. Further, the decoder unit 210 identifies the one or more indicium locations 402a, 402b, 402c, and 402d that encompass the indicium 406. Further, the decoder unit 210 may be configured to segment the example image 400 into the plurality of the image tiles 404a, 404b, 404c, . . . , and 404n. In an example embodiment, the decoder unit 210 may be configured to segment the image using a sliding window of the predetermined size. For example, a size of the sliding window is 48 pixels by 48 pixels. Accordingly, in some examples, each image tile 404a, 404b, 404c, . . . , and 404n in the image is of the size 48 pixels by 48 pixels. Further, the plurality of image tiles 404a, 404b, 404c, . . . , and 404n includes one or more image tiles 404a, 404b, 404c, . . . , 404l that include a portion of the indicium 406. As discussed, the first processor 202 may select the image tile of the one or more image tiles 404a, 404b, 404c, . . . , 404l. For example, the first processor 202 selects the image tile 404b as the image tile.

In some examples, the scope of the disclosure is not limited to segmenting the image using the sliding window. In an example embodiment, the decoder unit 210 may be configured to utilize other techniques to segment the image as known by one skilled in the art.

FIG. 5 illustrates a flowchart 314 of a method for retrieving the image tile from the image, according to one or more embodiments described herein.

At step 502, the indicia scanner 102 includes means such as the first processor 202, the decoder unit 210, and/or the like for retrieving the one or more image tiles from the image (based on segmentation of the image in the step 312). As discussed in the step 312, each of the one or more image tiles includes the portion of the indicium.

At step 504, the indicia scanner 102 includes means such as the first processor 202, the decoder unit 210, and/or the like for determining a quality score for the each of the one or more image tiles in the image. In an example embodiment, to determine the quality score of the one or more image tiles, the decoder unit 210 may be configured to determine a measure of one or more image characteristics associated with each of the one or more image tiles. Some examples of the one or more image characteristics may include, but are not limited to, sharpness, noise, dynamic range, and/or the like. In some examples, sharpness of an image may correspond to an amount of detail an image can convey. The sharpness of the image may be affected by the aberrations the one or more optical assemblies (design and manufacturing quality, focal length, aperture, and distance from the image center) and sensor (pixel count and anti-aliasing filter), focus accuracy, and atmospheric disturbances (thermal effects and aerosols), and/or the like. In some examples, the noise may correspond to a random variation of pixel density in the image. For example, visible grains in the image may correspond to noise in the image. In some examples, the dynamic range of the image may correspond to a difference between minimum pixel value and the maximum pixel value in the image.

In an example embodiment, the decoder unit 210 may be configured to determine a weighted sum of the measure of the one or more image characteristics associated with each of the one or more image tiles. In some examples, the weighted sum may correspond to the quality score associated with each of the one or more image tiles.

In some examples, the scope of the disclosure is not limited to the quality score being the weighted sum of the one or more image characteristics. In an example embodiment, the decoder unit 210 may utilize other mathematical means to determine the quality score for each of the one or more image tiles in the image. For example, since each of the one or more image tiles includes the portion of the indicium, the decoder unit 210 may utilize ANSI X3.182, ISO15415, and ISO/IEC 15416 standards to determine the quality score of each of the one or more image tiles.

At step 506, the indicia scanner 102 includes means such as the first processor 202, the decoder unit 210, and/or the like for selecting the image tile from the one or more image tiles in the image. In an example embodiment, the decoder unit 210 may be configured to select an image tile having a minimum quality score amongst the quality score of the one or more image tiles. In an example embodiment, the decoder unit 210 may be configured to consider the selected image tile in the image as the image tile. Further, the decoder unit 210 may consider the portion of the indicium in the image tile as the portion of the indicium. Since each of the one or more image tiles are of the size 48 by 48 (i.e., the size of the first sliding window that is used to scan the image), accordingly, the size of the image tile is also 48 by 48.

In some examples, the scope of the disclosure is not limited to the selecting the image tile having the minimum quality score amongst the one or more image tiles. In an example embodiment, the decoder unit 210 may be configured to randomly select the image tile of the one or more image tiles. In yet another embodiment, the scope of the disclosure is not limited to the selecting only one image tile. In an example embodiment, the decoder unit 210 may be configured to select more than one image tiles based on the quality score associated with each of the plurality of image tiles. For example, the decoder unit 210 may be configured to select two image tiles having lowest quality score amongst the one or more image tiles.

At step 508, the indicia scanner 102 includes means such as the first processor 202, the decoder unit 210, and/or the like for determining the one or more image tile locations in the image that encompass the image tile in the image. For example, the decoder unit 210 may be configured to define a bounding box that encompasses the selected image tile in the image. Thereafter, the decoder unit 210 may be configured to determine coordinates of the one or more corners of the bounding box encompassing the selected image tile. In an example embodiment, the decoder unit 210 may be configured to consider the coordinates of the one or more corners of the bounding box as the one or more image tile locations in the image.

Figure 6:
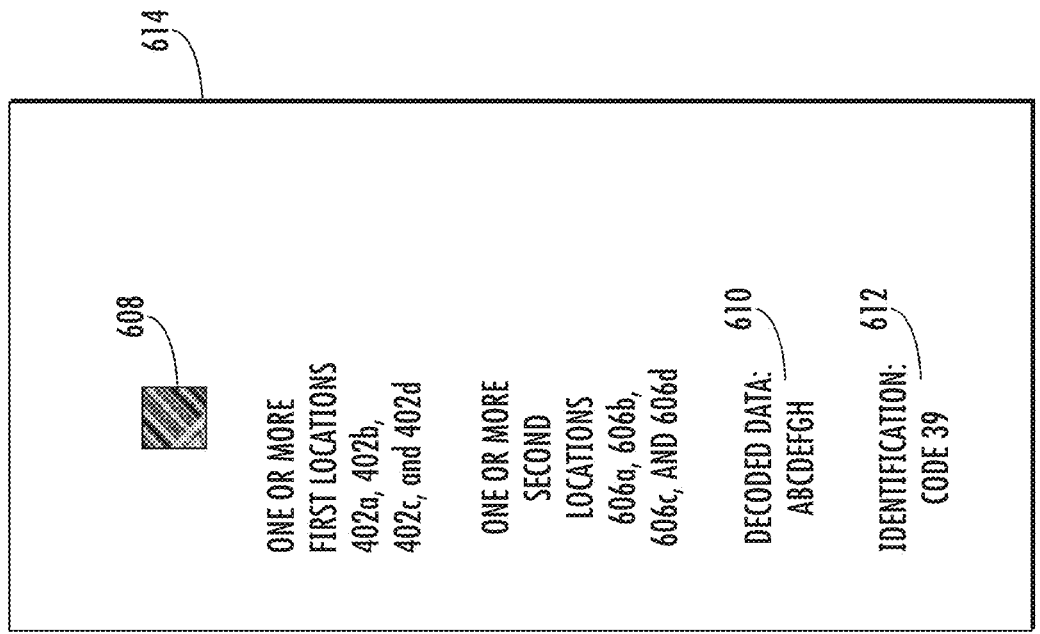
FIG. 6 illustrates an example image, according to one or more embodiments described herein.
Figure 6:
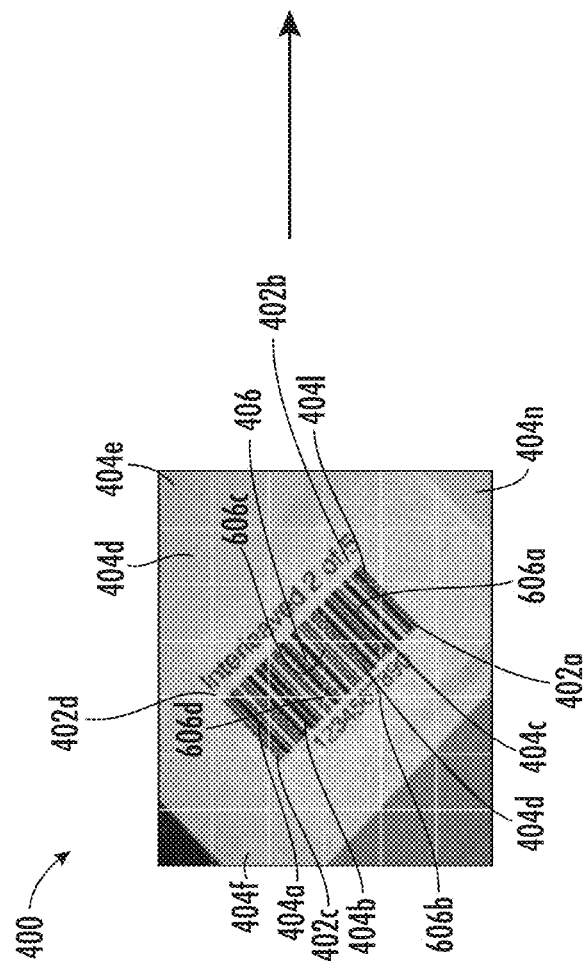

FIG. 6 illustrates the example image 400, according to one or more embodiments described herein. In some examples, the example image 400 includes the indicium 406 that is encompassed by one or more indicium locations 402a, 402b, 402c, and 402d. Further, from the one or more image tile locations 606a, 606b, 606c, and 606d, the decoder unit 210 retrieves the image tile 404b that includes a portion of the indicium 406 (depicted by 608). Additionally, the decoder unit 210 may be configured to decode the indicium 402 to generate the decoded data (depicted by 610). Additionally or alternatively, the decoder unit 210 may be configured to determine the barcode symbology identifier (depicted by 612) associated with the indicium 402. For instance, the barcode symbology identifier (depicted by 612) is Code 39. In an example embodiment, the barcode symbology identifier (depicted by 612) associated with the indicium 402, the one or more indicium locations 502a, 502b, 502c, and 502d, the one or more image tile locations 606a, 606b, 606c, and 606d, the portion of the indicium (depicted by 608), and the decoded data (depicted by 610) constitute the indicia data 614. Additionally or alternatively, the indicia data 614 may include the size of the image (e.g., resolution of the image).

As discussed, the indicia scanner 102 may be configured to transmit the indicia data (e.g., the indicia data 614) to the central server 106. The structure and operation of the central server 106 is herein described.

Structure of the Central Server 106

FIG. 7 illustrates a block diagram of the central server 106, according to one or more embodiments described herein. In an example embodiment, the central server 106 includes a second processor 702, a second memory device 704, a second communication interface 706, an image processing unit 708, and a training data generation unit 710.

The second processor 702 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 7 as a single processor, in an embodiment, the second processor 702 may include a plurality of processors and signal processing modules. The plurality of processors may be embodied on a single electronic device or may be distributed across a plurality of electronic devices collectively configured to function as the circuitry of the central server 106. The plurality of processors may be in operative communication with each other and may be collectively configured to perform one or more functionalities of the circuitry of the central server 106, as described herein. In an example embodiment, the second processor 702 may be configured to execute instructions stored in the second memory device 704 or otherwise accessible to the second processor 702. These instructions, when executed by the second processor 702, may cause the circuitry of the central server 106 to perform one or more of the functionalities, as described herein.

Whether configured by hardware, firmware/software methods, or by a combination thereof, the second processor 702 may include an entity capable of performing operations according to embodiments of the present disclosure while configured accordingly. Thus, for example, when the second processor 702 is embodied as an ASIC, FPGA or the like, the second processor 702 may include specifically configured hardware for conducting one or more operations described herein. Alternatively, as another example, when the second processor 702 is embodied as an executor of instructions, such as may be stored in the second memory device 704, the instructions may specifically configure the second processor 702 to perform one or more algorithms and operations described herein.

Thus, the second processor 702 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 704 may include suitable logic, circuitry, and/or interfaces that are adapted to store a set of instructions that is executable by the second processor 702 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the second memory device 704 may be integrated with the second processor 702 on a single chip, without departing from the scope of the disclosure.

The second communication interface 706 may correspond to a communication interface that may facilitate transmission and reception of messages and data to and from various devices operating in the system environment 70 through the network 74. For example, the second communication interface 706 is communicatively coupled with the indicia scanner 102 through the network 74. In some examples, through the second communication interface 706, the central server 106 may be configured to receive the indicia data from the indicia scanner 102. Examples of the second communication interface 706 may include, but are not limited to, an antenna, an Ethernet port, a USB port, a serial port, or any other port that can be adapted to receive and transmit data. The second communication interface 706 transmits and receives data and/or messages in accordance with the various communication protocols, such as but not limited to, I2C, TCP/IP, UDP, and 2G, 3G, 4G, or 5G communication protocols.

Figure 8:
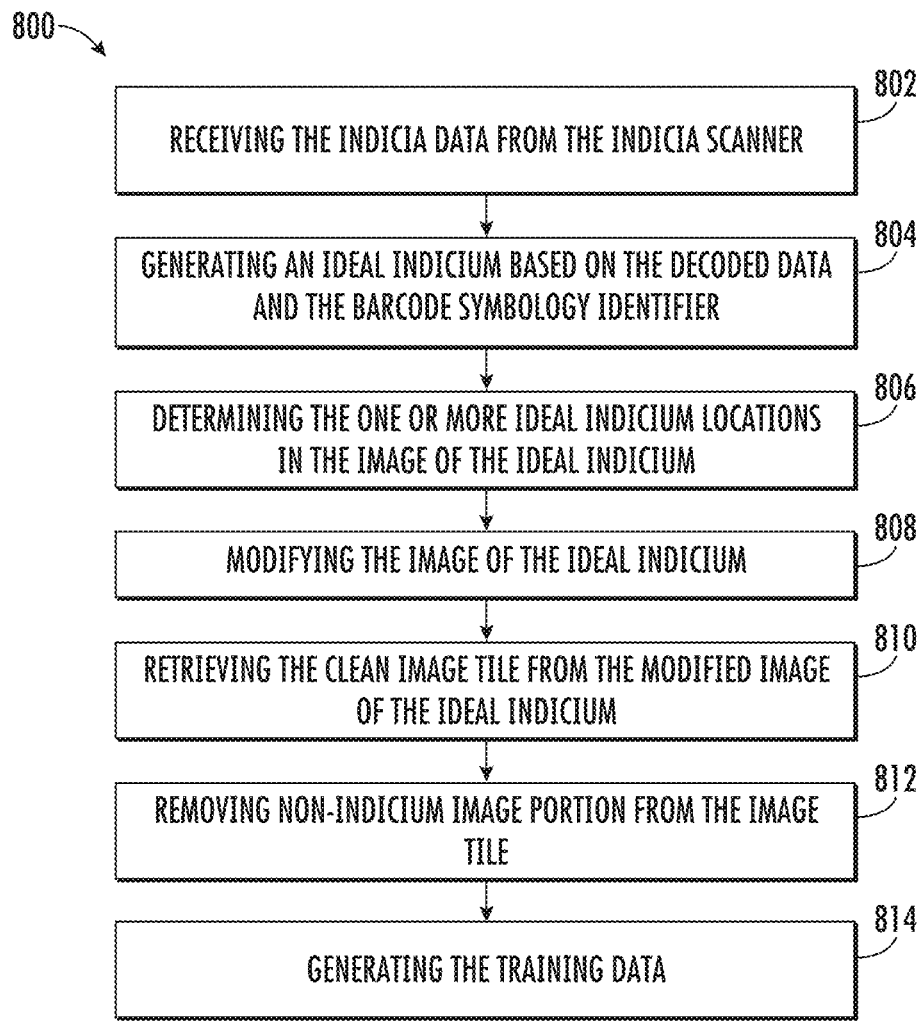
FIG. 8 illustrates a flowchart of a method for operating the central server, according to one or more embodiments described herein.
Figure 9:
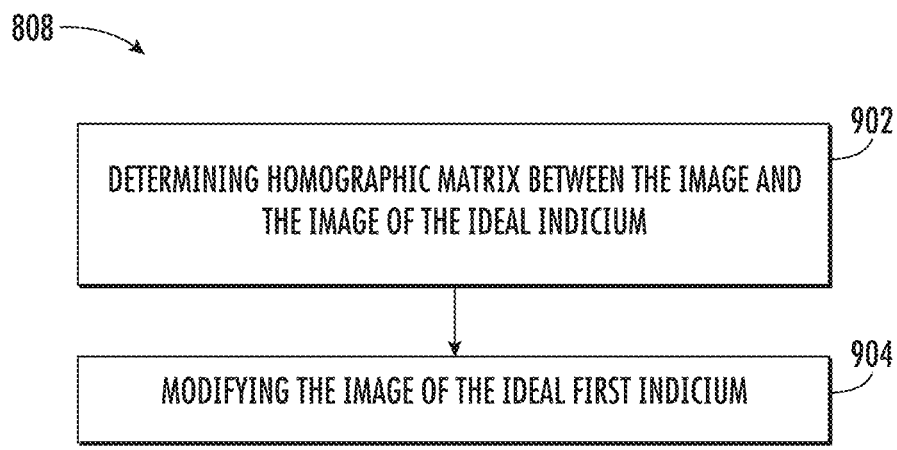
FIG. 9 illustrates a flowchart of a method for rendering modified image, according to one or more embodiments described herein.
Figure 10:
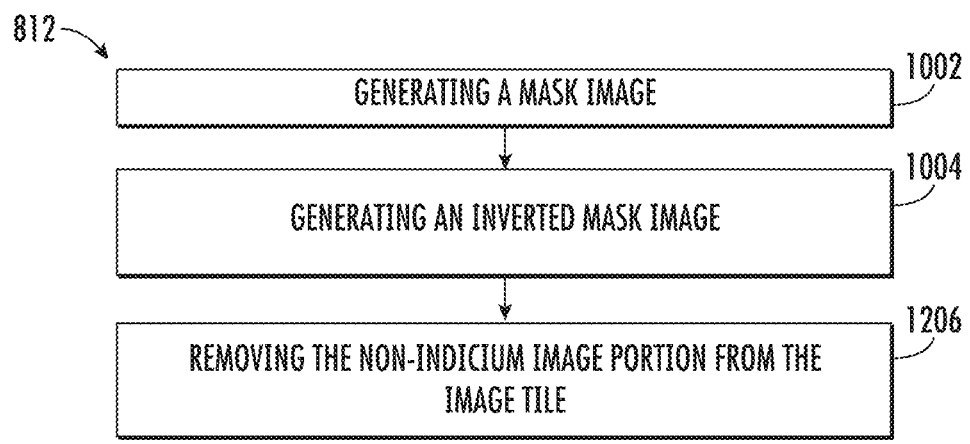
FIG. 10 illustrates a flowchart of a method for removing the non-indicium image portion (containing ancillary information) from the portion of the indicium, according to one or more embodiments described herein.

The image processing unit 708 may include suitable logic and/or circuitry that may enable the image processing unit 708 to process one or more images, as is further described FIGS. 8, 9, and 10. In an example embodiment, the image processing unit 708 may be configured to utilize one or more known image processing techniques to process one or more images. Some examples of the one or more image processing techniques may include, but not limited to, edge detection, Scale invariant feature transform (SIFT), and/or the like. The image processing unit 708 may be implemented using one or more of Application Specific Integrated Circuit (ASIC) and Field Programmable Gate Array (FPGA).

The training data generation unit 710 may include suitable logic and/or circuitry that may enable the training data generation unit 710 to generate the training data. In an example embodiment, the training data generation unit 710 may generate a pair-wise data comprising the portion of the ideal indicium and the portion of the indicium, as is further described in FIG. 8. In an example embodiment, the training data generation unit 710 may consider the pair-wise data as the training data. The image processing unit 708 may be implemented using one or more of Application Specific Integrated Circuit (ASIC) and Field Programmable Gate Array (FPGA).

FIGS. 8, 9, and 10 illustrate example flowcharts and example methods of the operations performed by an apparatus, such as the central server 106 of FIG. 1 in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8, 9, and 10, when executed, convert a computer or processing circuitry into a particular machine configured to perform an example embodiment of the present invention. Accordingly, the operations of FIGS. 8, 9, and 10, define an algorithm for configuring a computer or processor, to perform an example embodiment. In some cases, a general purpose computer may be provided with an instance of the processor which performs the algorithm of FIGS. 8, 9, and 10, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Clean/Damaged Tile Pair Generation

FIG. 8 illustrates a flowchart 800 of a method for operating the central server 106, according to one or more embodiments described herein.

At step 802, the central server 106 may include means such as the second processor 702, the second communication interface 706, and/or the like, for receiving the indicia data from the indicia scanner 102. As discussed above, the indicia data includes the decoded data, the one or more indicium locations that encompass the indicium (scanned by the indicia scanner 102) in the image (captured by the indicia scanner 102), the one or more image tile locations that encompass the portion of the indicium in the image, the image tile (that includes the portion of the indicium), the size of the image (e.g., the resolution of the image), and the barcode symbology identifier of the indicium.

At step 804, the central server 106 may include means such as the second processor 702, the image processing unit 708, and/or the like, for generating an ideal indicium based on the decoded data and the barcode symbology identifier associated with the indicium. As discussed, the barcode symbology identifier associated with the indicium may be indicative of the type of the indicium (e.g., the type of indicium may include a barcode). In some examples, image processing unit 708 may be configured to encode the decoded data (obtained in the indicia data) to generate an ideal indicium, where the barcode symbology identifier of the ideal indicium is same as the barcode symbology identifier of the scanned indicium (scanned by the indicia scanner 102). For example, if the barcode symbology identifier of the indicium indicates that the indicium is a Code 39, the ideal indicium (generated by the image processing unit 708) will also be Code 39. In an example embodiment, the image processing unit 708 may utilize one or more known methodologies to generate the ideal indicium such as, but not limited to, ZINT barcode generator, and/or any other application that outputs a graphical image of the ideal indicium. Since the image processing unit 708 utilizes the decoded data to generate the ideal indicium, the ideal indicium is same as the scanned indicium. The ideal indicium is an ideal form the indicium. Accordingly, the ideal indicium should be noise free since the image processing unit 708 generates the ideal indicium. On the other hand, the indicium in the image (captured by the indicia scanner 102) may be noisy because of the ambient factors and/or tolerances associated with the image capturing unit 208. Some examples of the ambient factors and/or tolerances of the image capturing unit 208 may include, but are not limited to, lens aberrations, dynamic range of the image sensor, sensitivity of the image sensor, lighting conditions of the ambient where the indicia scanner 102 operates, and/or the like. Additionally or alternately, the indicium in the image may be noisy because of the printing errors and/or scuffs created on the label during shipping. A person having ordinary skills in the art would appreciate generating the ideal indicium includes generating an image of the ideal indicium.

At step 806, the central server 106 may include means such as the second processor 702, the image processing unit 708, and/or the like, for determining the one or more ideal indicium locations in the image of the ideal indicium such that the one or more ideal indicium locations may encompass the ideal indicium in the image of the ideal indicium. For example, the one or more ideal indicium locations may define the periphery of the ideal indicium in the image of the ideal indicium. In an example embodiment, the image processing unit 708 may utilize methodologies described in the step 306 to determine the one or more ideal indicium locations.

At step 808, the central server 106 may include means such as the second processor 702, the image processing unit 708, and/or the like, for modifying the image of the ideal indicium based on the one or more scanned indicium locations, the one or more ideal indicium locations, and the size of the image. The modification of the image of the ideal indicium is further described in conjunction with FIG. 9. Modifying the image of the ideal indicium leads to generation of the modified image of the ideal indicium. In an example embodiment, the size of the modified image of the ideal indicium is same as the size of the image. Further, in the modified image of the ideal indicium, the positioning and orientation of the ideal indicium is same as the positioning and orientation of the indicium in the image.

At step 810, the central server 106 may include means such as the second processor 702, the image processing unit 708, and/or the like, for retrieving a clean image tile from the modified image of the ideal indicium. In some examples, the image processing unit 708 may be configured to utilize the one or more image tile locations, received in the indicia data, to retrieve the clean image tile from the modified image of the ideal indicium. As discussed above in the flowchart 300, the one or more image tile locations may encompass the portion of the indicium in the scanned image. Further, as discussed in step 808, the positioning and orientation of the ideal indicium in the modified image of the ideal indicium is same as the positioning and orientation of the indicium in the image. Furthermore, as discussed in the step 808, the image and the modified image of the ideal indicium are of same size. Accordingly, the one or more image tile locations may encompass the portion of the ideal indicium in the modified image of the ideal indicium. More particularly, the portion of the ideal indicium encompassed by the one or more image tile locations in the modified image of the ideal indicium is same as the portion of the indicium (encompassed by the one or more image tile locations in the image). In some embodiments, this allows the second processor 702 to bypass creating tiles for the entire ideal image and create tiles only for corresponding locations in the ideal image. Since the portion of the ideal indicium is retrieved from the ideal indicium, the portion of the ideal indicium may be cleaner and noise free in comparison the portion of the scanned indicium. Since the indicium (scanned by the indicia scanner 102) and the ideal indicium (generated by image processing unit 708) are same, the image processing unit 708 may consider the identified tile of the ideal indicium as a clean portion of the indicium.

At step 812, the central server 106 may include means such as the second processor 702, the image processing unit 708, and/or the like, for removing a non-indicium image portion from the image tile. In an example embodiment, the non-indicium image portion in the image tile may include ancillary content. In some examples, the ancillary content may correspond to content other than the portion of the indicium. For example, the ancillary content may include, but not limited to, numerals, text characters, and/or any other symbols that does not correspond to indicium. The removal of the non-indicium image portion from the scanned image tile is further described in FIG. 8. The image tile obtained after removal of the non-indicium image portion is referred to as damaged image tile.

At step 814, the central server 106 may include means such as the second processor 702, the training data generation unit 710, and/or the like, for generating the training data. In an example embodiment, the training data generation unit 710 may generate a pairwise data that includes damaged portion of the indicium and the clean portion of the indicium. Further, the training data generation unit 710 may consider the pairwise data as the training data.

FIG. 9 illustrates a flowchart 808 of a method for rendering the modified image of the ideal indicium, according to one or more embodiments described herein.

At step 902, the central server 106 may include means such as the second processor 702, the image processing unit 708, and/or the like, for determining a homographic matrix between the scanned image and the image of the ideal indicium based on the one or more indicium locations in the scanned image, the one or more indicium locations in the ideal indicium, and the size of the scanned image. In an example embodiment, the homographic matrix may correspond to a transformation matrix that maps the one or more indicium locations in the scanned image with the one or more indicium locations in the image of the ideal indicium. In an example embodiment, the image processing unit 708 may be configured to utilize the following equation to determine the homographic matrix:

$$\begin{vmatrix} x_2 \\ y_2 \\ 1 \end{vmatrix} = \begin{vmatrix} H_{11} & H_{12} & H_{13} \\ H_{20} & H_{22} & H_{23} \\ H_{30} & H_{23} & H_{33} \end{vmatrix} * \begin{vmatrix} x_1 \\ y_1 \\ 1 \end{vmatrix} \quad (1)$$

Where $\begin{vmatrix} H_{11} & H_{12} & H_{13} \\ H_{20} & H_{22} & H_{23} \\ H_{30} & H_{23} & H_{33} \end{vmatrix}$ ; Homographic matrix;

$\begin{vmatrix} x_1 \\ y_1 \\ 1 \end{vmatrix}$ : One or more indicium locations on the image of the ideal indicium;

and $\begin{vmatrix} x_2 \\ y_2 \\ 1 \end{vmatrix}$ : One or more indicium locations on the scanned image.

At step 904, the central server 106 may include means such as the second processor 702, the image processing unit 708, and/or the like, for modifying the image of the ideal indicium. I an example embodiment, the image processing unit 708 may be configured to utilize the homographic matrix to modify the image of the ideal indicium to generating the modified image of ideal indicium. For example, image processing unit 708 may be configured to transform one or more ideal indicium locations (encompassing the ideal indicium in the image of the ideal indicium) to one or more clean image tile locations using the homographic matrix. In some examples, the image processing unit 708 may be configured to utilize following equations to determine the one or more clean image tile locations:

$$X_2 = HX_1 \quad (2)$$

Where, $X_2$: one or more clean image tile locations;

H: Homographic Matrix; and $X_1$: one or more ideal indicium locations in the image of the ideal indicium.

In an example embodiment, the one or more clean image tile locations within which the ideal indicium needs to be positioned. In some embodiment, the process of positioning the ideal indicium within the one or more clean image tile locations, is referred to as warp perspective. Additionally, in some examples, the image processing unit 708 may be configured to may be configured to pad pixels such that the size of the image of the ideal indicium is same as the size of the image.

FIG. 10 illustrates a flowchart 812 of a method for removing the non-indicium image portion (containing ancillary information) from the portion of the indicium, according to one or more embodiments described herein.

At step 1002, the central server 106 may include means such as the second processor 702, the image processing unit 708, and/or the like, for generating a mask image. In some examples, the image processing unit 708 may be configured to retrieve the clean image tile from the modified image, as is described in the step 810. Thereafter, in an example embodiment, the image processing unit 708 may be configured to determine an intersection between the clean image tile and the modified image of the ideal indicium to generate the mask image. In an example embodiment, the intersection between two images identifies common portions in both the images. For example, the intersection between the clean image tile and the modified image of the ideal indicium may include the portion of the ideal indicium that is included in the clean image tile. Accordingly, the mask image includes the portion of the ideal indicium that is common in both the clean image tile and the modified image of the ideal indicium. Further, the portion of the ideal indicium is blacked out in mask image. For example, color associated with the pixels representing the portion of the ideal indicium in the mask image is converted to black color.

At step 1004, the central server 106 may include means such as the second processor 702, the image processing unit 708, and/or the like, for mask generating an inverted image. In an example embodiment, the image processing unit 708 may be configured to invert the color scheme in the mask image to generate the inverted mask image. For example, the portion in the mask image that includes black colored pixels are converted to white colored pixels and vice versa.

At step 1006, the central server 106 may include means such as the second processor 702, the image processing unit 708, and/or the like, for removing the non-indicium image portion (containing ancillary content) from the image tile. In an example embodiment, the image processing unit 708 may be configured to an AND operation between the inverted mask image and the image tile. The inverted mask image highlights portions of the image that is devoid of the portion of the ideal indicium by performing AND operation between the inverted mask image and the image tile to remove the ancillary content included in the image tile. Accordingly, the modified image tile is devoid of ancillary content. Further, the modified image tile is referred to as damaged snippet of the indicium.

In some examples, the scope of the disclosure is not limited to using the mask image to remove the non-indicium image portion from the image tile. In an example embodiment, the image processing unit 708 may be configured to utilize one or more edge detection techniques to differentiate between the portion of the scanned indicium and the ancillary content. Accordingly, the image processing unit 708 may remove the ancillary content from the portion of the scanned indicium. In another example, the image processing unit 708 may utilize one or more known object identification techniques (such as SIFT) techniques to differentiate between the ancillary content and the portion of the indicium.

Figure 11:
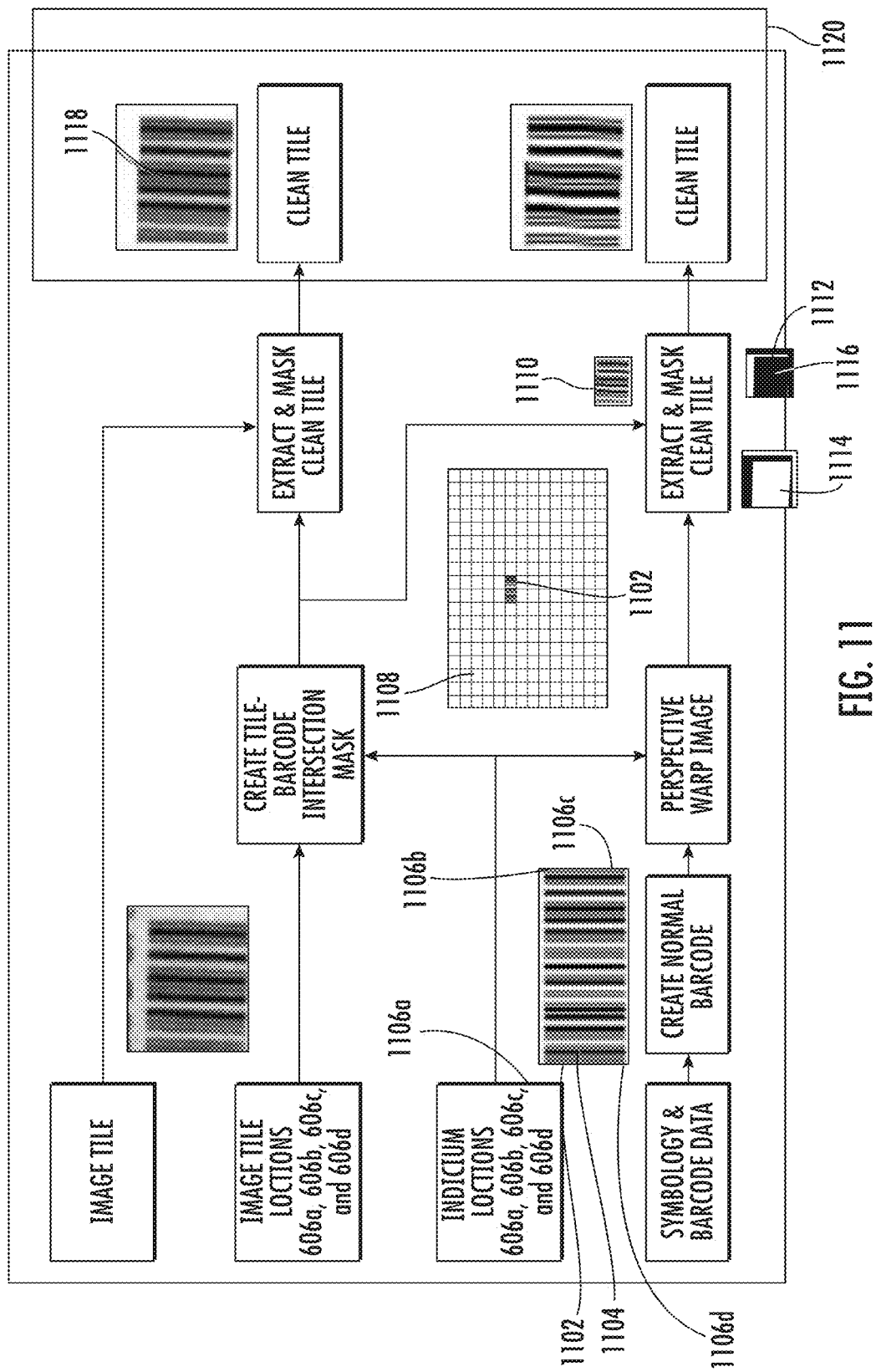
FIG. 11 is an example flow diagram illustrating the operation performed at the central server, according to one or more embodiments described herein.

FIG. 11 is an example flow diagram 1100 illustrating the operation performed at the central server 106, according to one or more embodiments described herein.

The example flow diagram 1100 illustrates the indicia data 614. As discussed in FIG. 6, the indicia data includes the barcode symbology identifier (depicted by 612) associated with the indicium 402, the one or more indicium locations 402a, 402b, 402c, and 402d, the one or more image tile locations 606a, 606b, 606c, and 606d, the image tile 608, and the decoded data (depicted by 610). In some examples, the image processing unit 708 generates an image of the ideal indicium 1102 that includes the ideal indicium 1104 by using the decoded data and the barcode symbology identifier (depicted by 612) associated with the scanned indicium. Thereafter, the image processing unit 708 determines the one or more ideal indicium locations 1106a, 1106b, 1106c, and 1106d of the ideal indicium, in the image of the ideal indicium. The one or more ideal indicium locations 1106a, 1106b, 1106c, and 1106d may correspond to locations of one or more corners of the ideal indicium 1104 in the image of the ideal indicium 1102.

In an example embodiment, the image processing unit 708 may be configured to modify the image of the ideal indicium 1102 based on the one or more indicium locations 402a, 402b, 402c, and 402d (received in the indicia data 614) and the one or more ideal indicium locations 1106a, 1106b, 1106c, and 1106d, as is described in the flowchart 812. In some examples, the ideal indicium 1104 in the modified image of the ideal indicium 1108 has same perspective as that of the indicium in the image (captured by the indicia scanner 102). Thereafter, the image processing unit 708 may be configured to retrieve the clean image tile that includes the portion 1110 of the ideal indicium 1104 from the modified image of the ideal indicium 1108 using the one or more image tile locations 606a, 606b, 606c, and 606d (received in the indicia data 614), as is described in the step 810. Additionally, the image processing unit 708 may be configured to generate the mask image 1112 and inverted mask image 1114 by determining an intersection between the clean image tile and the modified image of the ideal indicium 1108, as is described in the step 812. As depicted in the mask image 1112, a portion 1116 is blacked out. The portion 1116 corresponds to the common portion in the ideal indicium 1104 and the portion 1110 of the ideal indicium 1104. In some examples, the common portion may correspond to the portion of the ideal indicium 1104. The inverted mask image 1114 includes inverted color scheme than that of the mask image 1112. Thereafter, the inverted mask image is ANDed with the image tile 608 to remove ancillary content (i.e., non-indicium portion) in the image tile 608. The resultant image 1118 obtained after the AND operation is referred to as the damaged portion of the indicium 406. Further, the portion 1110 of the ideal indicium 1104 is referred to as the clean portion of the indicium. The pairwise data of the clean portion of the indicium 1110 and the damaged portion 1118 of the indicium constitute the training data 1120.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

What is claimed is:

1. A method comprising:
   receiving, by a processor, indicia data from an indicia scanner, wherein the indicia data comprises at least decoded data obtained based on decoding an indicium in an image, an image tile comprising a portion of the indicium, and/or location of one or more corners of the portion of the indicium in the image;
   generating, by the processor, an image of an ideal indicium based on at least the decoded data;
   modifying, by the processor, the image of the ideal indicium to generate a modified image of the ideal indicium;
   retrieving, by the processor, a clean image tile, from the modified image of the ideal indicium, wherein the clean image tile comprises a portion of the ideal indicium; and
   generating, by the processor, training data, wherein the training data includes the portion of the indicium and the portion of the ideal indicium.

2. The method of claim 1, wherein an orientation of the ideal indicium in the modified image is the same as an orientation of the indicium in the image.

3. The method of claim 1 further comprising:
   modifying, by the processor, the image of the ideal indicium based on location of one or more corners of the ideal indicium in the image of the ideal indicium, and a homographic matrix.

4. The method of claim 3, wherein the homographic matrix corresponds to a transformation matrix representing relation between one or more indicium locations in the image and one or more ideal indicium locations.

5. The method of claim 1 further comprising:
   generating, by the processor, a mask image based on an intersection between the modified image of the ideal indicium and the clean image tile.

6. The method of claim 5 further comprising:
   generating, by the processor, an inverted mask image by inverting color scheme in the mask image.

7. The method of claim 6 further comprising:
   removing, by the processor, ancillary content from the portion of the indicium based on an edge detection technique or an object identification technique to generate a modified image tile, wherein the modified image tile constitutes the training data.

8. A system comprising:
   an indicia scanner configured to capture an image of a field of view, wherein the image includes an indicium; and
   a central server configured to communicate with the indicia scanner, wherein the indicia scanner is configured to:
   segment the image into a plurality of image tiles,
   determine a quality score for each of one or more image tiles of the plurality of image tiles, wherein the one or more image tiles comprises a portion of the indicium,
   select an image tile of the one or more image tiles based on the quality score associated with each of the one or more image tiles, and
   transmit the image tile to the central server, wherein the image tile constitutes training data for training a machine learning model.

9. The system of claim 8, wherein the central server is a computing device that is in communication with the indicia scanner.

10. The system of claim 8, wherein the indicia scanner is further configured to:
    segment the image into the plurality of image tiles based on a predetermined size.

11. The system of claim 8, wherein the indicia scanner is further configured to:
    determine the quality score for each of the one or more image tiles of the plurality of image tiles based on one or more image characteristics of the one or more image tiles.

12. The system of claim 11, wherein the one or more image characteristics comprise at least one of sharpness, noise or dynamic range in the one or more image tiles.

13. The system of claim 8, wherein the indicia scanner is further configured to:
    select the image tile with a minimum quality score amongst the one or more image tiles.

14. The system of claim 8, wherein the indicia scanner is further configured to:
    determine a barcode symbology identifier of the indicium, and
    transmit the barcode symbology identifier to the central server.

15. A method comprising:
    capturing, by an image capturing unit, an image of a field of view of an indicia scanner, wherein the image includes an indicium;
    segmenting, by a processor, the image into a plurality of image tiles,
    determining, by the processor, a quality score for each of one or more image tiles of the plurality of image tiles, wherein the one or more image tiles comprises a portion of the indicium,
    selecting, by the processor, at least one image tile of the one or more image tiles based on the quality score associated with each of the one or more image tiles, and
    transmitting, by the processor, the at least one image tile to a central server, wherein the image tile constitutes training data for training a machine learning model.

16. The method of claim 15, wherein the central server is a computing device that is in communication with the indicia scanner.

17. The method of claim 15, wherein the processor is further configured to:
    segment the image into the plurality of image tiles based on a predetermined size.

18. The method of claim 15, wherein the processor is further configured to:
    determine the quality score for each of the one or more image tiles of the plurality of image tiles based on one or more image characteristics of the one or more image tiles.

19. The method of claim 18, wherein the one or more image characteristics comprise at least one of sharpness, noise, or dynamic range in the one or more image tiles.

20. The method of claim 15, wherein the processor is further configured to:
 select the at least one image tile with a minimum quality score amongst the one or more image tiles.

* * * * *